US009263796B1

(12) United States Patent
Sanchez et al.

(10) Patent No.: US 9,263,796 B1
(45) Date of Patent: Feb. 16, 2016

(54) SHIELDING CELL PHONE RADIATION

(71) Applicant: LifeWave, Inc., San Diego, CA (US)

(72) Inventors: George Sanchez, National City, CA (US); David G. Schmidt, Poway, CA (US)

(73) Assignee: LifeWave, Inc., San Diego, CA (US)

( * ) Notice: Subject to any disclaimer, the term of this patent is extended or adjusted under 35 U.S.C. 154(b) by 569 days.

(21) Appl. No.: 13/658,679

(22) Filed: Oct. 23, 2012

Related U.S. Application Data

(60) Provisional application No. 61/687,026, filed on Apr. 16, 2012.

(51) Int. Cl.

*H04B 1/38* (2015.01)
*H01Q 1/52* (2006.01)
*H01Q 17/00* (2006.01)

(52) U.S. Cl.

CPC ............. *H01Q 1/526* (2013.01); *H01Q 17/005* (2013.01)

(58) Field of Classification Search

CPC ..... H04B 1/3838; H04Q 17/007; H01Q 1/526
USPC .................. 455/46, 66.1, 575.1, 575.5, 575.8
See application file for complete search history.

(56) References Cited

U.S. PATENT DOCUMENTS

2004/0226836 A1* 11/2004 Schreiber et al. ............. 206/305
2010/0243904 A1* 9/2010 Mueller et al. ................ 250/349
2011/0098090 A1* 4/2011 Parienti et al. ................ 455/566

* cited by examiner

*Primary Examiner* — Tuan Pham
(74) *Attorney, Agent, or Firm* — Sheppard Mullin Richter & Hampton LLP

(57) ABSTRACT

Devices and methods to reduce or attenuate electromagnetic radiation emitted by an electronic device such that the electromagnetic radiation does not impinge on a user of the electronic device include one or more layers of material. The one or more layers of material have properties including one or both of absorption and/or reflection of electromagnetic radiation in frequency ranges used for wireless telephonic communication. The one or more layers of material are arranged to be disposed near the back side of the electronic device. Use of the one or more layers of material attenuates the electromagnetic radiation as measured at or near the front of the electronic device during use by about 75%.

18 Claims, 7 Drawing Sheets

SHIELDING CELL PHONE RADIATION

RELATED APPLICATIONS

This application claims priority to U.S. Patent Application Ser. No. 61/687,026, entitled "NEW METHODS IN REDUCING CELL PHONE RADIATION," and filed Apr. 16, 2012. This application is hereby incorporated by reference into the present application in its entirety.

FIELD OF THE INVENTION

The invention relates to a device to shield electromagnetic radiation from cell phones and other electronic devices so that the electromagnetic radiation does not impinge on the user of those electronic devices. The invention also relates to methods of operation or manufacture of these devices.

BACKGROUND OF THE INVENTION

It is known that electronic devices, including cell phones, emit electromagnetic radiation during operation. It is known that at least some emitted electromagnetic radiation impinges on the users of the electronic devices. It is known that impingement of electromagnetic radiation may be undesirable under certain circumstances. It is known that electromagnetic radiation may be attenuated by various mechanisms, including absorption, deflection, and/or other mechanisms.

SUMMARY

One aspect of the invention relates to a device configured to shield a user from electromagnetic radiation by an electronic device. The electronic device may include a mobile telecommunications device, such as a cell phone, and/or the functionality thereof. The electronic device may include other wireless (local area) networking functionality, such as Wi-Fi™. The electronic device may be integrated, combined, embedded, and/or operating conjunctively with a mobile telephone.

In the context of this disclosure, "shield," "shielding," and variations thereof refer to a reduction in the amount of electromagnetic radiation impinging, e.g., on a user. This reduction may be quantified as an attenuation of a particular number of decibels, as a percentage, and/or in other ways. The attenuation may vary within a range of frequencies of the electromagnetic radiation. In other words, the specific attenuation may depend on characteristics of the electromagnetic radiation, including frequency or frequency range. The specific attenuation may be measured under various operating conditions, including but not limited to stand-by mode, telephonic usage, data transfer, and/or other modes of operation. The specific attenuation may be measured in different positions, including but not limited to at or near the front of the electronic device, at or near the back of the electronic device, at a predetermined distance from the front or back of the electronic device, and/or other positions. For example, the predetermined distance may correspond to the average distance users hold a telephone from their ear, face, and/or head, or in other words, about 1 inch, about 2 inches, about 3 inches, about 4 inches, about 6 inches, about 8 inches, about 10 inches, about 12 inches, and/or other predetermined distances.

The pertinent range of frequencies of the electromagnetic radiation targeted for shielding depends on the specific telecommunication services and/or telecommunication standards used by the electronic devices. The predominant range of frequencies to shield may be between about 450 MHz and about 2.5 GHz. In the context of this disclosure, a "predominant" range of frequencies refers to a frequency range that includes the intended telecommunications signal, and/or a frequency range that includes the majority of the amount of energy within the emitted electromagnetic radiation. Any one particular telecommunications standard may only cover a portion of this range. For example, the Universal Mobile Telecommunications System (UMTS) frequency band as used in the United States may be 1710-1755 MHz and 2110-2155 MHz for uplink and downlink, respectively. Note that the specific frequency bands used may vary across operators/carriers, and may vary between different geographic locations.

Reduction of electromagnetic radiation emitted by an electronic device may be viewed in relation to the amount of electromagnetic radiation that impinges on a user of the electronic device. Reduction of electromagnetic radiation may be accomplished through various mechanisms, including but not limited to absorption, deflection, and/or other mechanisms to reduce the amount of electromagnetic radiation that impinges on the user of the electronic device.

Reduction of emitted electromagnetic radiation may be accomplished through a body that includes one or more layers of material arranged at or near at least a portion of the back of the electronic device. In some embodiments, the body may include peripheral portions that may be arranged at or near one or more lateral sides (or segments thereof) of the electronic device. In some embodiments, the body may include holes, gaps, cut-outs, and/or other open spaces for one or more components of the electronic device. For example, these components may need to be accessible and/or unblocked, such as, by way of non-limiting example, buttons, switches, screens, control interface components, speakers, cameras, antennas, and/or other components. It is noted that the number of these components and the placement thereof varies between models and brands of electronic devices, such that, e.g., a newly-released model of a particular smartphone would need a device configured to shield a user from electromagnetic radiation having specific dimensions, peripheral portions, cut-outs, holes, and/or other device-dependent characteristics.

In some embodiments, one or more peripheral portions may be arranged and/or folded such that a portion of the front side of the electronic device may be covered. It is noted that the portion of the front side of the electronic device that is used for user interaction may need to remain uncovered by the body. For example, if the electronic device includes a touch screen that substantially covers the entire front side, then the body may be arranged to be disposed at or near the back side and one or more lateral sides rather than the front side.

The one or more layers of material may include a first layer of material having the property of attenuating electromagnetic radiation through absorption by at least 25 dB in a particular range of frequencies, a second layer of material having the property of attenuating electromagnetic radiation through deflection by at least 25 dB in a particular range of frequencies, and/or one or more other layers. The particular range of frequencies may be the predominant range of frequencies between about 450 MHz and about 2.5 GHz, between about 700 MHz and about 1.5 GHz, between about 2.0 GHz and about 3.0 GHz, and/or ranges of frequencies. The attenuation of the first, second, and/or other layer of material may be about 30 dB, about 40 dB, about 50 dB, about 60 dB, about 70 dB, about 80 dB, between about 25 dB and 35 dB, between about 30 dB and about 50 dB, between about 40 dB and about 60 dB, and/or other amounts of attenuation. The attenuation of multiple layers of material may be different, and/or may be specified for different frequency ranges.

In some embodiments, the layer of material having the predominant property of attenuating electromagnetic radiation through absorption may have an attenuation of about 25 dB, about 30 dB, about 40 dB, about 50 dB, about 60 dB, and/or another amount of attenuation. In some embodiments, the layer of material having the predominant property of attenuating electromagnetic radiation through deflection may have an attenuation of about 25 dB, about 30 dB, about 40 dB, about 50 dB, about 60 dB, about 70 dB, about 80 dB, and/or another amount of attenuation. It is understood that attenuation may be frequency-dependent. It is understood that materials may have multiple properties. For example, a material that has the property of attenuating electromagnetic radiation through absorption may also have, to some extent, the property of attenuating electromagnetic radiation through deflection, and/or vice versa. In the context of this disclosure, a "predominant" property refers to the highest level of attenuation that is contributed to a particular mechanism for attenuation, for a particular type of material. In other words, if the property of attenuating electromagnetic radiation through deflection is about 25 dB and the property of attenuating electromagnetic radiation through absorption is about 40 dB for the same material, this particular material may be referred to as having a predominant property of attenuating electromagnetic radiation through absorption.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Impingement (on users) of electromagnetic radiation emitted by electronic devices, including mobile telephones, may be undesirable under certain circumstances.

Figure 1:
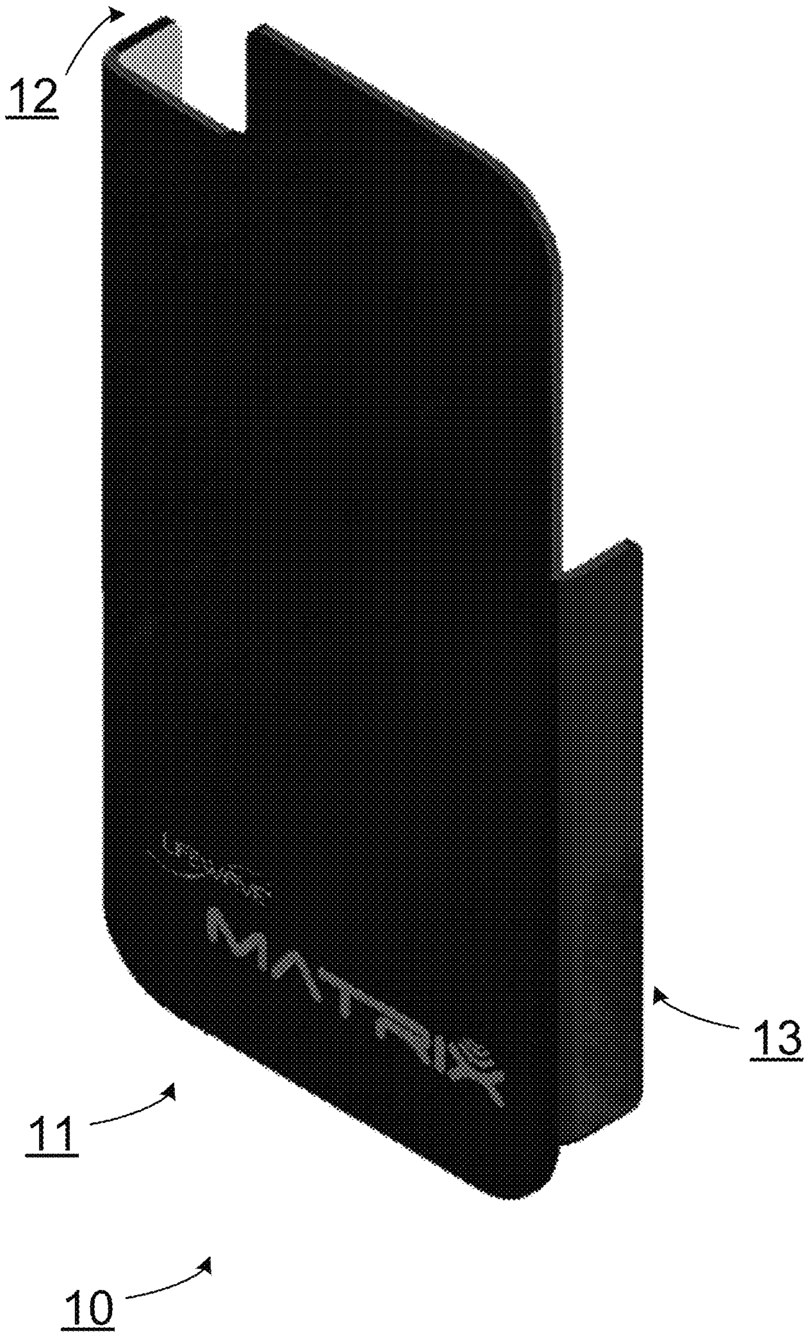
FIGS. 1-3 illustrate isometric views of a device configured to shield electromagnetic radiation emitted from an electronic device.

FIG. 1 illustrates an isometric view of a device 10 configured to shield electromagnetic radiation emitted from an electronic device (not shown in FIG. 1). The electronic device may have a front side, back side, and multiple lateral sides. By way of non-limiting example, device 10 may be configured to shield a user from electromagnetic radiation emitted by an iPhone™ 4S™ or similar mobile telephone/smartphone. Device 10 includes a body 11 including one or more layers of material. The one or more layers of material have properties including absorption and/or deflection of electromagnetic radiation in a particular range of frequencies. The particular range of frequencies may be from about 450 MHz to about 2.5 GHz, and/or any subset thereof. The attenuation of electromagnetic radiation in the particular range of frequencies may be about 25 dB, at least 25 dB, about 30 dB, about 40 dB, about 50 dB, about 60 dB, and/or other amount of decibels of attenuation per layer of material or per combination of multiple layers of material. Body 11 may be arranged to be disposed at or near the back side of an electronic device.

One or more layers of material may have the predominant property of attenuating electromagnetic radiation through absorption by about 25 dB, about 30 dB, about 40 dB, about 50 dB, about 60 dB, and/or another amount of attenuation. In some embodiments, such a layer may include carbon-based fabric, such as the carbon-based microwave-absorbing fabric described in U.S. Patent Application Ser. No. 61/687,026, entitled "NEW METHODS IN REDUCING CELL PHONE RADIATION," and filed Apr. 16, 2012, which is hereby incorporated by reference into the present application in its entirety. This application is hereinafter referred to as "the '026 application." The described level of attenuation ranges between at least 25 dB and about 35 dB for the frequency range between 1 GHz and 10 GHz. In some embodiments, body 11 may include multiple layers of such carbon-based fabric.

One or more layers of material may have the predominant property of attenuating electromagnetic radiation through deflection by about 25 dB, about 30 dB, about 40 dB, about 50 dB, about 60 dB, about 70 dB, about 80 dB, and/or another amount of attenuation. In some embodiments, such a layer may include radio-frequency (RF) shielding fabric, such as the cobalt-alloy-coated RF-shielding fabric described in the '026 application as fabric provided by CobalTex™. The thread of this fabric includes a polyester core covered by nickel, copper, nickel, and a cobalt alloy. The described level of electric field attenuation for this material ranges between about 40 dB and about 100 dB for frequencies ranging from 0.1 MHz to 1000 MHz. The described level of magnetic shielding attenuation for this material ranges between about 25 dB and about 80 dB for frequencies ranging from about 10 MHz and 1000 MHz. In some embodiments, body 11 may include multiple layers of such RF-shielding fabric.

In some embodiments that include multiple layers of material, e.g. at least one layer of carbon-based (microwave-absorbing) fabric and at least one layer of (cobalt-alloy-coated) RF-shielding fabric, one or more layers of a first type of material, e.g. carbon-based fabric, may be arranged to be disposed closer to the back side of the electronic device than one or more layers of a different type of material, e.g. RF-shielding fabric. The opposite order may be used. The order may be dependent on the number, location, and/or type of antennas used for a particular type of electronic device, and/or on the selected type of electronic device, e.g. the model of smartphone. Other ways to order, arrange, organize, and/or place in a pattern multiple layers of material are contemplated within the scope of this disclosure.

In some embodiments, multiple layers of material, e.g. of carbon-based (microwave-absorbing) fabric, may be combined for enhanced effects.

Individual layers of body 11 and/or a combination of multiple layers may be laminated (e.g. with a polyethylene finish) and/or pressure-treated to reduce the thickness of body 11. A combination of between 2 and 4 layers may have a thickness between about 30 mils and about 60 mils, responsive to being pressure-treated. Prior to being pressure-treated such a combination may have a thickness between about ⅛ and ⅙ of an inch. In some embodiments, an adhesive may be applied to one or more sides of body 11 to (removably) fix body 11 in place against the back of an electronic device and/or within a case or cover of the electronic device.

Body 11 of device 10 as depicted in FIG. 1 may include one or more peripheral portions 13. The one or more peripheral portions 13 may be folded at substantially transverse angels with the center of body 11 in such a manner that the one or more peripheral portions 13 may be arranged to cover and/or be disposed at or near one or more lateral sides of an electronic device. In other words, a peripheral portion 13 may be folded around the side of the mobile telephone/smartphone. In some embodiments, one or more lateral sides of the electronic device may be covered by one or more peripheral portions 13 in a manner such that predetermined types of components of the electronic device are uncovered, such as, by way of non-limiting example, buttons or antennas.

In some embodiments, body 11 may include a cut-out 12 (and/or other open spaces) for one or more components of the electronic device. In the example depicted in FIG. 1, cut-out 12 may be configured to accommodate a camera of the mobile telephone/smartphone.

In some embodiments, the dimensions, shapes, sizes, and/or number of peripheral portions 13 of body 11 of device 10 may be configured such that at least a predetermined threshold of attenuation of emitted electromagnetic radiation is accomplished. In other words, the predetermined threshold may correspond to a maximum attenuation such that the electronic device can still operate as intended. For example, since 100% attenuation may prohibit telecommunication services, the predetermined threshold may be about 75%, about 80%, about 85%, about 90%, and/or another level of attenuation.

Measurements of the attenuation may include specific absorption rate (SAR) testing, such as a direct method SAR test. Measurements may be specific to a particular operating band, such as GSM850. Measurements may pertain to electromagnetic radiation emitted by the front of an electronic device, by the back of an electronic device, at different distances from a user's head or ear (ranging from 1 inch, ½ inch, 15 mm, to zero inch), at varying levels of relative ambient humidity or ambient temperature, and/or taking other variable operating conditions into account. For example, detailed results of such measurements are included with the '026 application. Using an iPhone™ 4S™ as the electronic device, a device similar to device 10 as depicted in FIG. 1 and FIG. 4 has been measured using SAR testing to attenuate radiation emitted through the front side by 62.89% using the GSM850 band, 83.98% through the front side using Band V, 94.65% through the back side using Band V and 95.32% through the back side using Band II.

Figure 2:
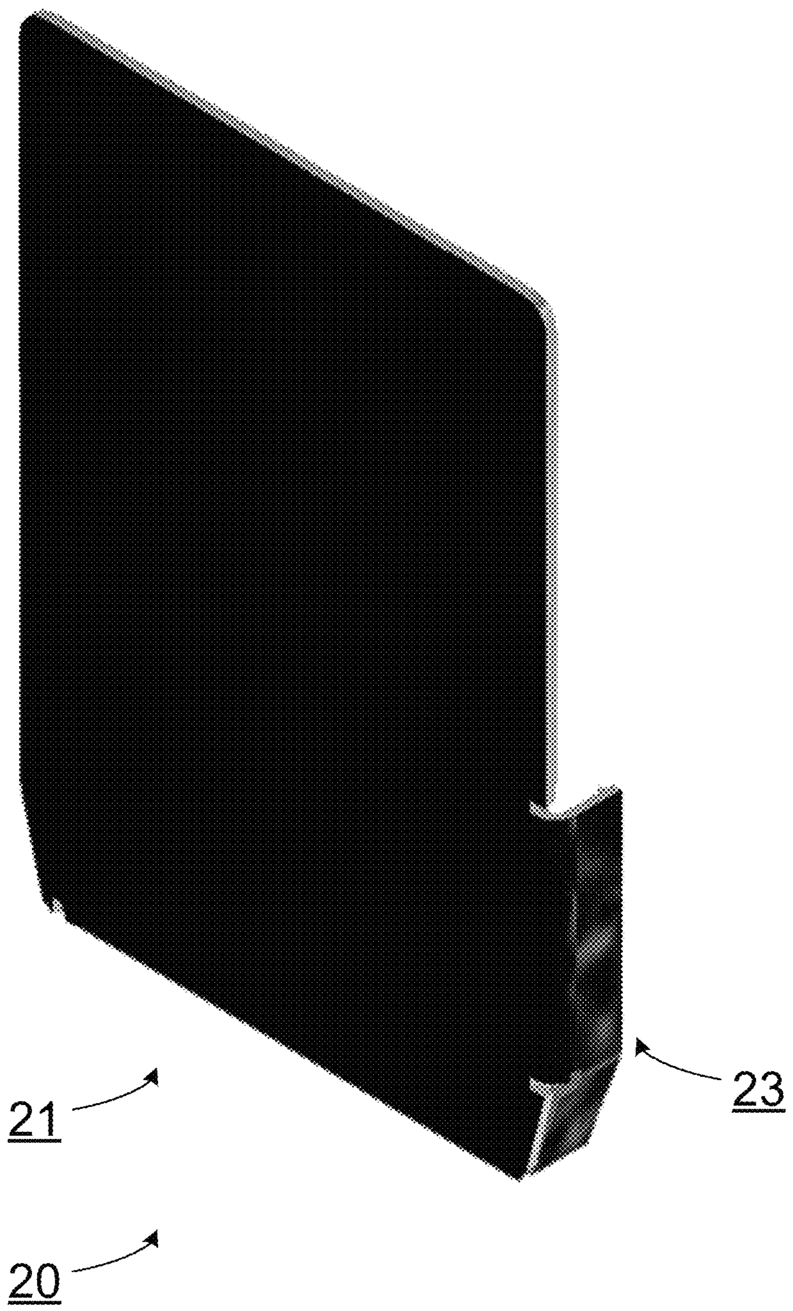

FIG. 2 illustrates an isometric view of a device 20 configured to shield electromagnetic radiation emitted from an electronic device (not shown in FIG. 2). By way of non-limiting example, device 20 may be configured to shield a user from electromagnetic radiation emitted by a Motorola™ RAZR™ or similar mobile telephone/smartphone. Device 20 includes a body 21 including one or more layers of material. In some embodiments, the one or more layers of material may be similar to the one or more layers as described herein with regard to body 11 of device 10 in FIG. 1. Referring to FIG. 2, body 21 of device 20 may include one or more peripheral portions 23. The one or more peripheral portions 23 may be folded at substantially transverse angels with the center of body 21 in such a manner that the one or more peripheral portions 23 may be arranged to cover and/or be disposed at or near one or more lateral sides of an electronic device. In other words, a peripheral portion 23 may be folded around the side of the mobile telephone/smartphone. In some embodiments, one or more lateral sides of the electronic device may be covered by one or more peripheral portions 23 in a manner such that predetermined types of components of the electronic device are uncovered, such as, by way of non-limiting example, buttons or antennas. Note that the description of peripheral portions 13 in FIG. 1 also applies to peripheral portions 23 in FIG. 2.

Figure 3:
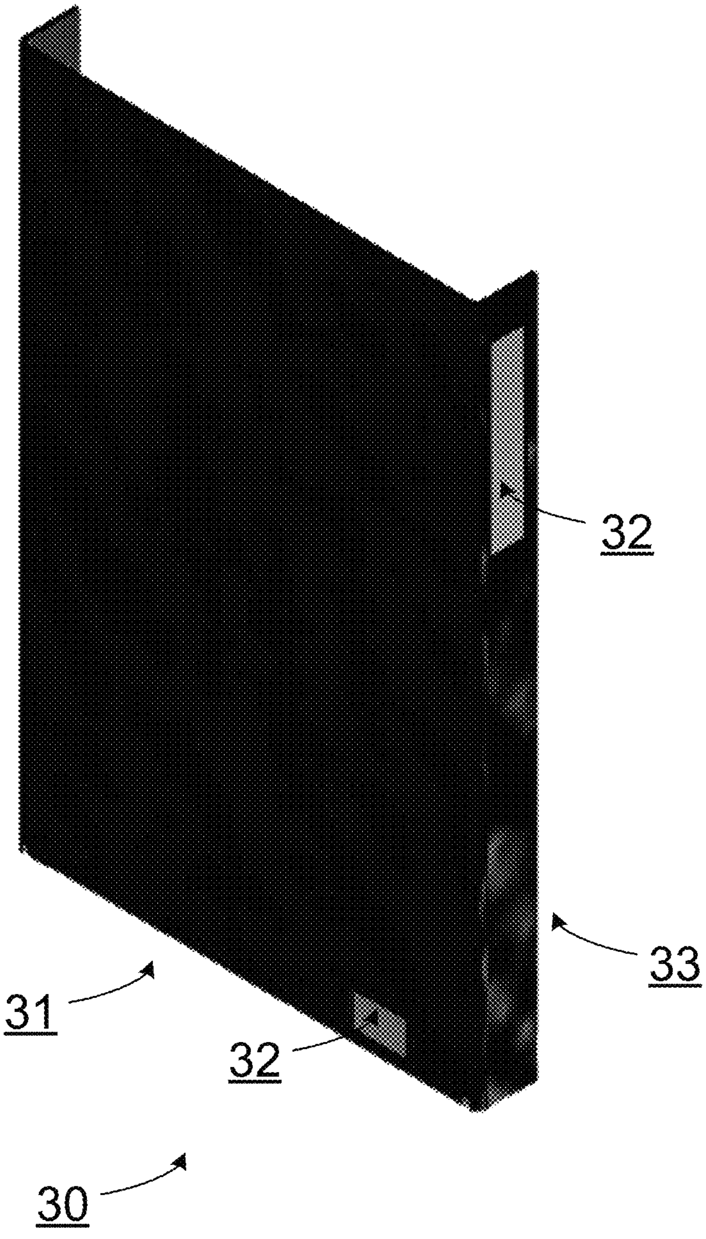

FIG. 3 illustrates an isometric view of a device 30 configured to shield electromagnetic radiation emitted from an electronic device (not shown in FIG. 3). By way of non-limiting example, device 30 may be configured to shield a user from electromagnetic radiation emitted by a Samsung™ Galaxy™ S2 or similar mobile telephone/smartphone. Device 30 includes a body 31 including one or more layers of material. In some embodiments, the one or more layers of material may be similar to the one or more layers as described herein with regard to body 11 of device 10 in FIG. 1. Referring to FIG. 3, body 31 of device 30 may include one or more peripheral portions 33. The one or more peripheral portions 33 may be folded at substantially transverse angels with the center of body 31 in such a manner that the one or more peripheral portions 33 may be arranged to cover and/or be disposed at or near one or more lateral sides of an electronic device. In other words, a peripheral portion 33 may be folded around the side of the mobile telephone/smartphone. In some embodiments, one or more lateral sides of the electronic device may be covered by one or more peripheral portions 33 in a manner such that predetermined types of components of the electronic device are uncovered, such as, by way of non-limiting example, buttons or antennas. Note that the description of peripheral portions 13 in FIG. 1 also applies to peripheral portions 33 in FIG. 3. In some embodiments, body 31 may include one or more cut-outs 32 or holes 32 (and/or other open spaces) for one or more components of the electronic device. In the example depicted in FIG. 3, one or more cut-outs 32 may be configured to accommodate a speaker, camera, and/or one or more control-buttons of the mobile telephone/smartphone.

Figure 4:
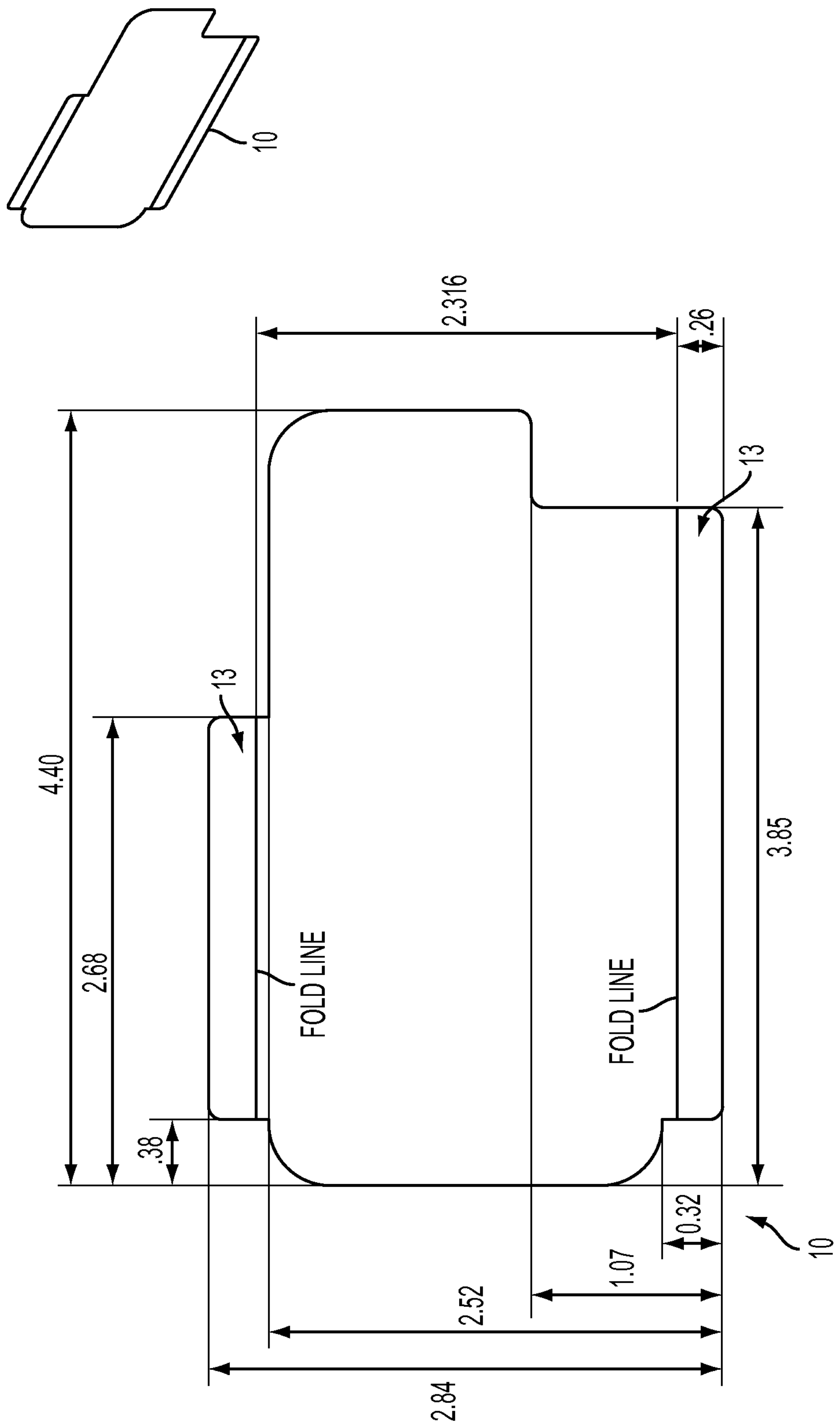
FIGS. 4-6 illustrate views of a device configured to shield electromagnetic radiation emitted from an electronic device.

FIG. 4 illustrates views and dimensions of device 10 configured to shield electromagnetic radiation emitted from an electronic device (not shown in FIG. 4). FIG. 4 includes two flat views of device 10, including peripheral portions 13 as described in relation to FIG. 1. Dimensions in FIGS. 4-6 are annotated in inches unless noted otherwise.

Figure 5:
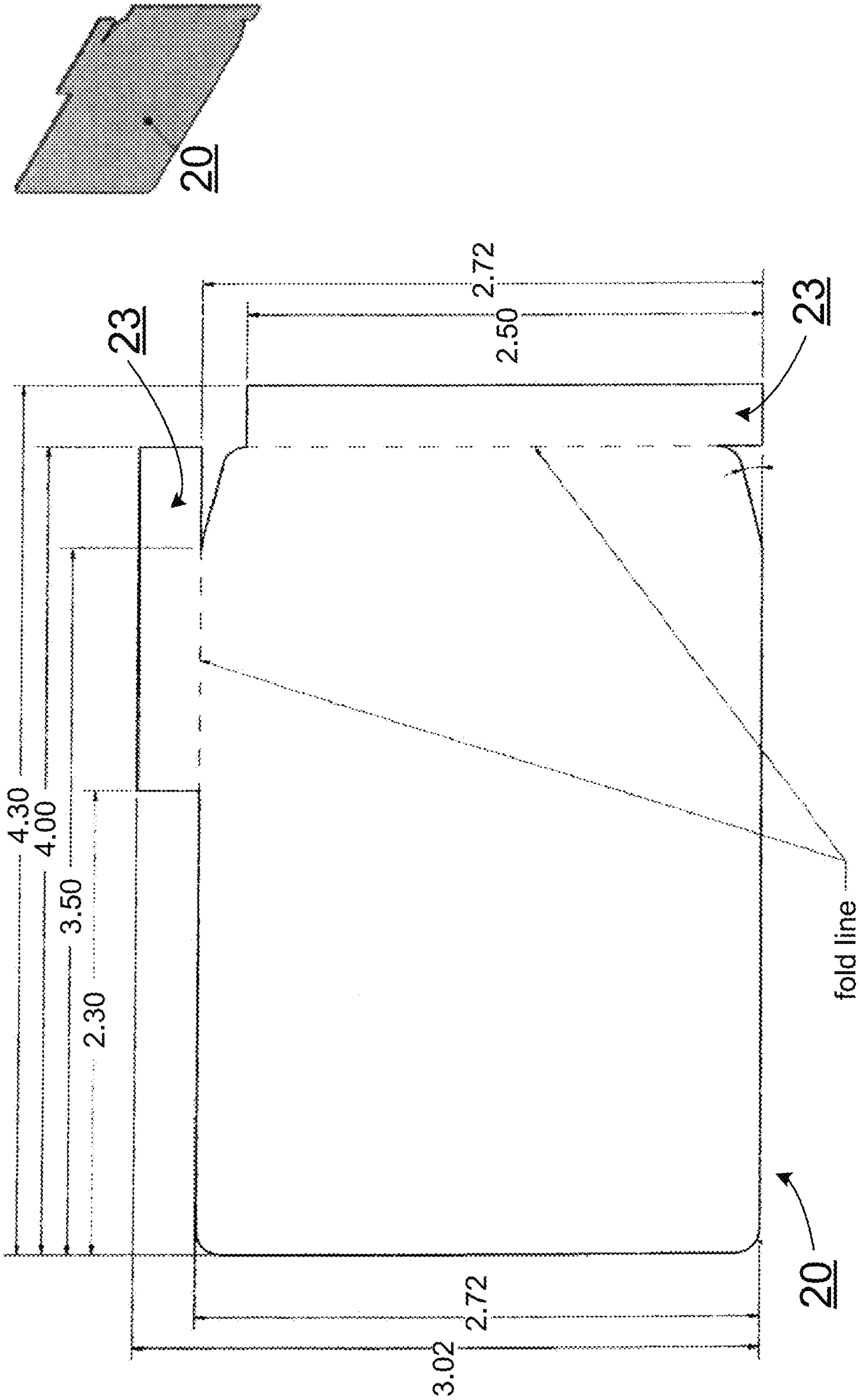

FIG. 5 illustrates views and dimensions of device 20 configured to shield electromagnetic radiation emitted from an electronic device (not shown in FIG. 5). FIG. 5 includes two flat views of device 20, including peripheral portions 23 as described in relation to FIG. 2.

Figure 6:
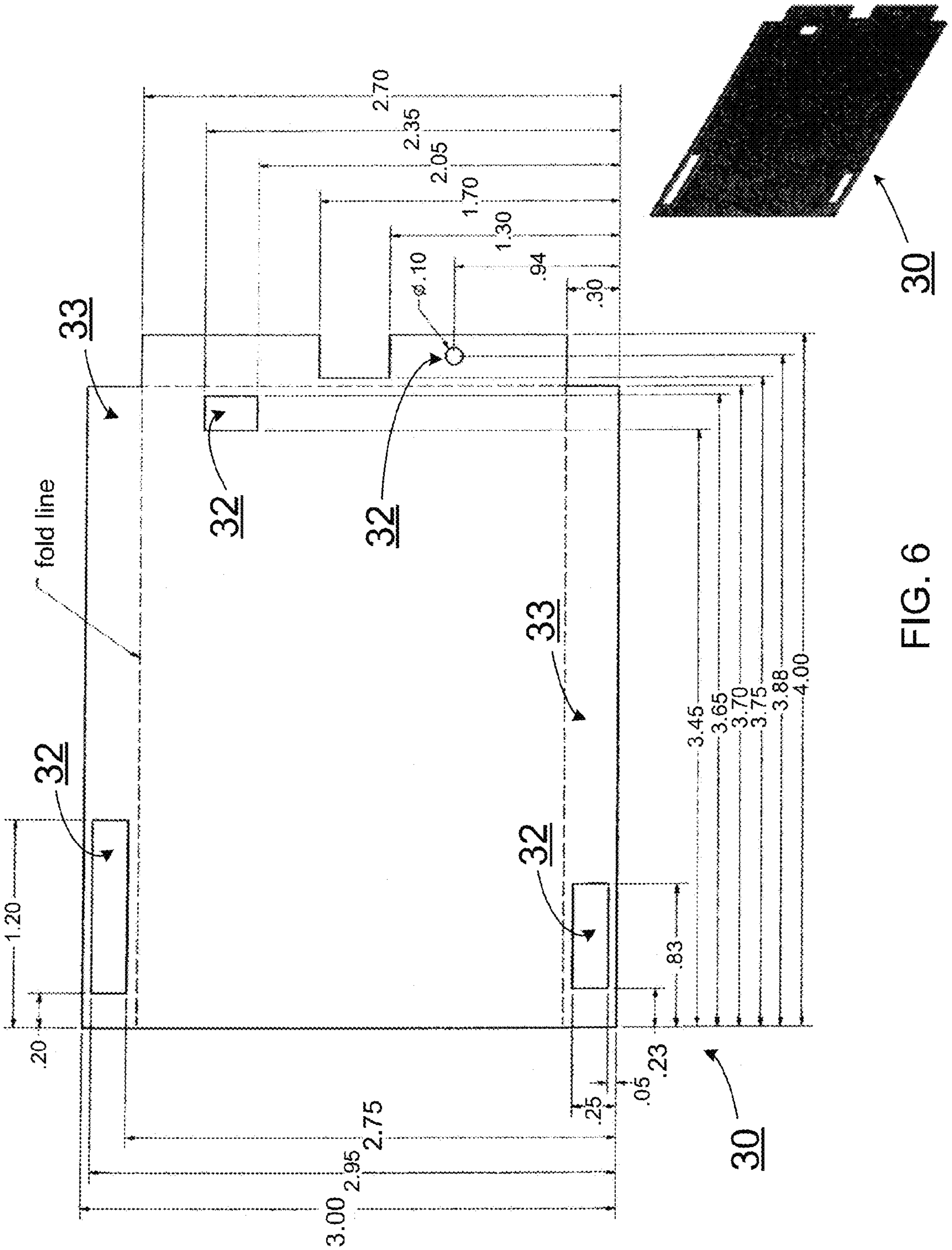

FIG. 6 illustrates views and dimensions of device 30 configured to shield electromagnetic radiation emitted from an electronic device (not shown in FIG. 6). FIG. 6 includes two flat views of device 30, including peripheral portions 33 and cut-outs 32 (or holes 32) as described in relation to FIG. 3.

Figure 7:
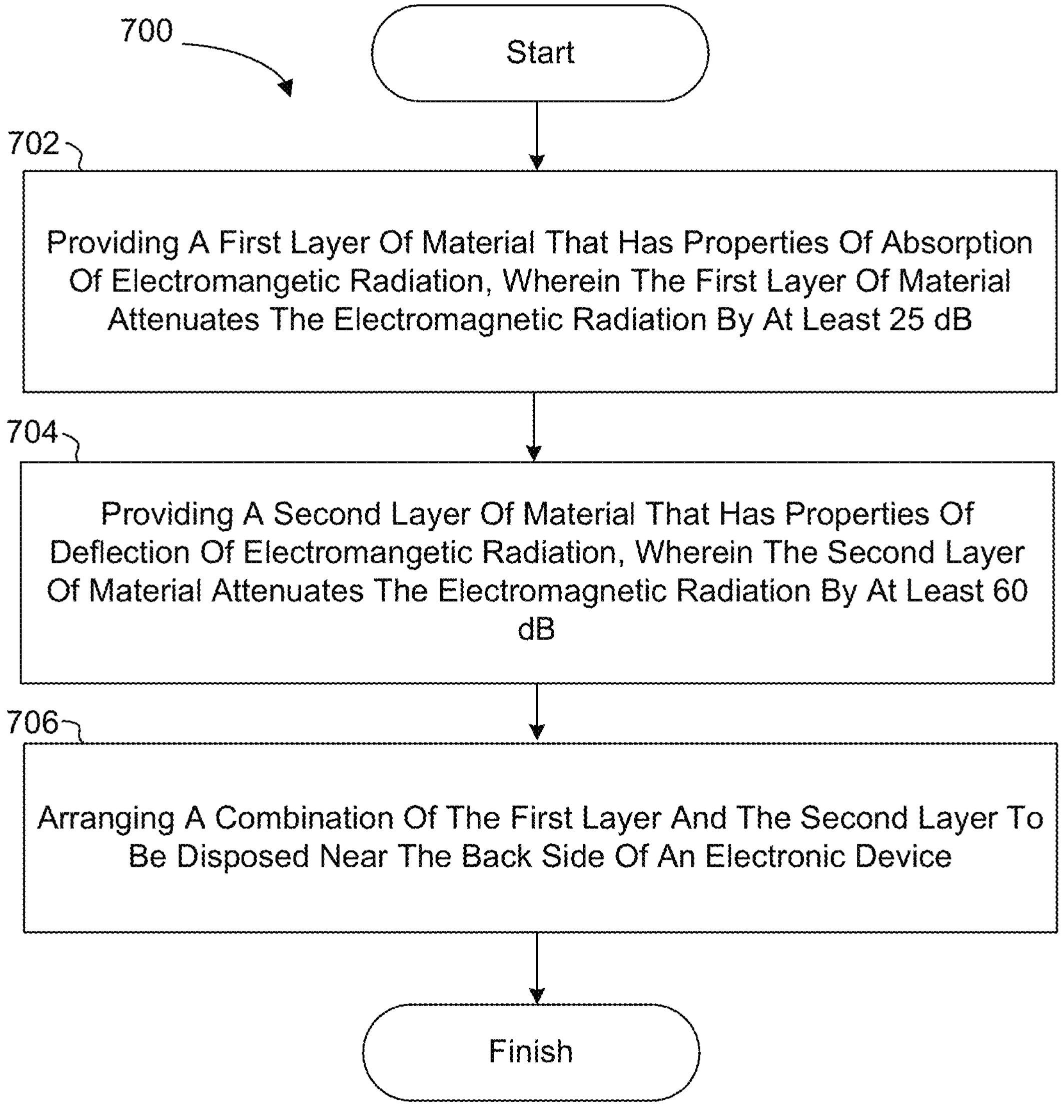
FIG. 7 illustrates a method to shield a user from electromagnetic radiation emitted by an electronic device.

FIG. 7 illustrates a method 700 to shield a user from electromagnetic radiation emitted by an electronic device. The operations of method 700 presented below are intended to be illustrative. In certain embodiments, method 700 may be accomplished with one or more additional operations not described, and/or without one or more of the operations discussed. Additionally, the order in which the operations of method 700 are illustrated in FIG. 7 and described below is not intended to be limiting.

At an operation 702, a first layer of material is provided that has properties of absorption of electromagnetic radiation. The absorption may pertain to a predominant range of frequencies between about 450 MHz and about 2.5 GHz. The first layer of material attenuates the electromagnetic radiation by at least 25 dB. In one embodiment, operation 702 is performed by a first layer of material of a body similar to or substantially the same as body 11 (shown in FIG. 1 and described above).

At an operation 704, a second layer of material is provided that has properties of deflection of electromagnetic radiation. The deflection may pertain to a predominant range of frequencies between about 450 MHz and about 2.5 GHz. The second layer of material attenuates the electromagnetic radiation by at least 60 dB. In one embodiment, operation 704 is performed by a second layer of material of a body similar to or substantially the same as body 11 (shown in FIG. 1 and described above).

At an operation 706, a combination of the first layer and the second layer is arranged to be disposed near the back side of an electronic device. In one embodiment, operation 706 is performed by a body similar to or substantially the same as body 11 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A device configured to shield a user from electromagnetic radiation emitted by an electronic device having a back side, a front side, and multiple lateral sides, wherein the electromagnetic radiation has a predominant range of frequencies between about 450 MHz and about 2.5 GHz, the device comprising:

a body including two or more layers of material, wherein a first layer of material has properties of absorption of the electromagnetic radiation in the predominant range of frequencies between about 450 MHz and about 2.5 GHz, wherein a second layer of material has properties of deflection of the electromagnetic radiation in the predominant range of frequencies between about 450 MHz and about 2.5 GHz, wherein the two or more layers of material attenuate the electromagnetic radiation in the predominant range of frequencies by at least 25 dB, wherein the second layer of material has properties of deflection of the electromagnetic radiation such that the electromagnetic radiation is attenuated by at least 60 dB through the second layer of material, and wherein the body is arranged to be disposed near the back side of the electronic device.

2. The device of claim 1, wherein the electronic device includes a mobile telephone.

3. The device of claim 1, wherein one or more peripheral portions of the body are arranged to be folded at substantially transverse angles with a center of the body, and wherein the body is further arranged such that the one or more peripheral portions are disposed near one or more lateral sides of the electronic device.

4. The device of claim 1, wherein the first material has properties of absorption of the electromagnetic radiation such that the electromagnetic radiation is attenuated by at least 25 dB through the first material.

5. The device of claim 1, wherein the first layer of material is arranged to be disposed closer to the back side of the electronic device than the second layer of material.

6. The device of claim 1, wherein the one or more layers of material include one or both of a carbon-based microwave-absorbing fabric and/or a cobalt-alloy-coated RF-shielding fabric.

7. The device of claim 6, wherein the cobalt-alloy-coated RF-shielding fabric includes fabric provided by CobalTex™.

8. The device of claim 1, wherein either individual layers of the body and/or a combination of layers of the body are laminated.

9. The device of claim 1, wherein either individual layers of the body and/or a combination of layers of the body are pressure-treated to reduce thickness.

10. The device of claim 1, wherein the body has a thickness of about 30 to about 60 mils.

11. The device of claim 1, wherein the electromagnetic radiation emitted by the electronic device during stand-by mode, as measured at or near the front side of the electronic device, is reduced by about 70% during use of the device configured to shield the user.

12. The device of claim 1, wherein the electromagnetic radiation emitted by the electronic device during telephonic communication, as measured at or near the front side of the electronic device, is attenuated by about 80% during use of the device configured to shield the user.

13. The device of claim 1, wherein the electromagnetic radiation emitted by the electronic device during stand-by mode, as measured at or near the back side of the electronic device, is attenuated by about 85% during use of the device configured to shield the user.

14. The device of claim 1, wherein the electromagnetic radiation emitted by the electronic device during telephonic communication, as measured at or near the back side of the electronic device, is attenuated by about 90% during use of the device configured to shield the user.

15. A method to shield a user from electromagnetic radiation emitted by an electronic device having a back side, a front side, and multiple lateral sides, the method comprising:

providing a first layer of material that has properties of absorption of electromagnetic radiation in a predominant range of frequencies between about 450 MHz and about 2.5 GHz, wherein the first layer of material attenuates the electromagnetic radiation in the predominant range of frequencies by at least 25 dB;

providing a second layer of material that has properties of deflection of electromagnetic radiation in the predominant range of frequencies such that the second layer of material attenuates the electromagnetic radiation in the predominant range of frequencies by at least 60 dB; and arranging a combination of the first layer and the second layer to be disposed near the back side of the electronic device.

16. The method of claim 15, further comprising:

folding one or more peripheral portions of the combination at substantially transverse angels with a center of the combination; and arranging one or more of the one or more peripheral portions near one or more lateral sides of the electronic device.

17. The method of claim 15, wherein the electromagnetic radiation emitted by the electronic device during telephonic communication, as measured at or near the front side of the electronic device, is attenuated by about 80%.

18. The method of claim 16, wherein one of the one or more peripheral portions covers about 75% of a first lateral side of the electronic device, and wherein another one of the one or more peripheral portions covers about 50% of a second lateral side of the electronic device.

* * * * *